Oct. 10, 1967                    L. A. LARSON                    3,346,239
COMBINED MATERIAL MIXER AND DISTRIBUTOR
Filed Jan. 4, 1966                                        2 Sheets-Sheet 1
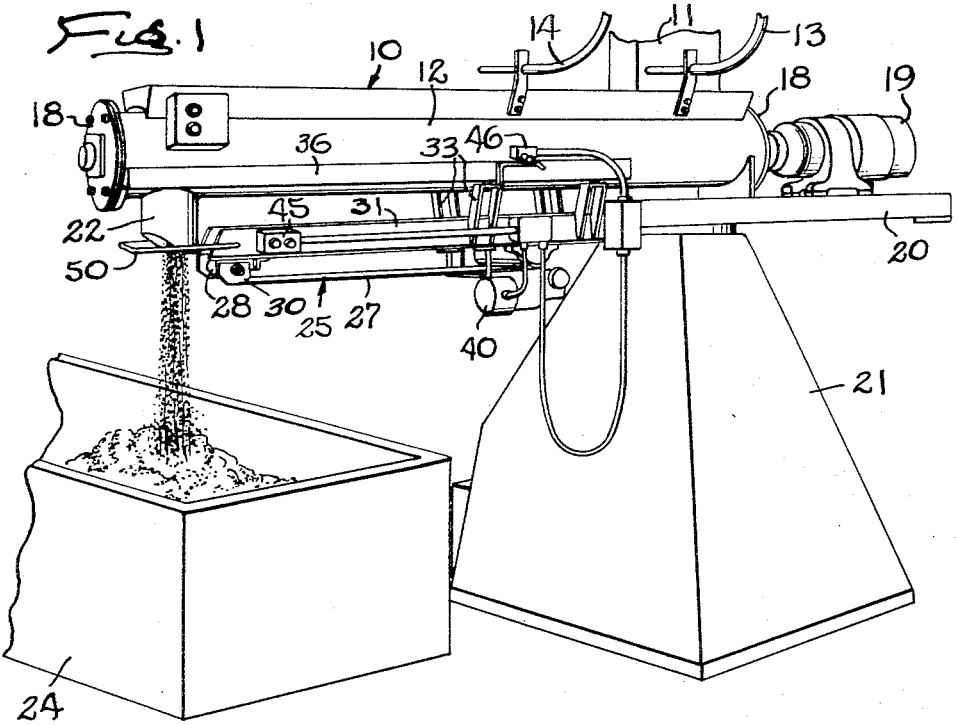
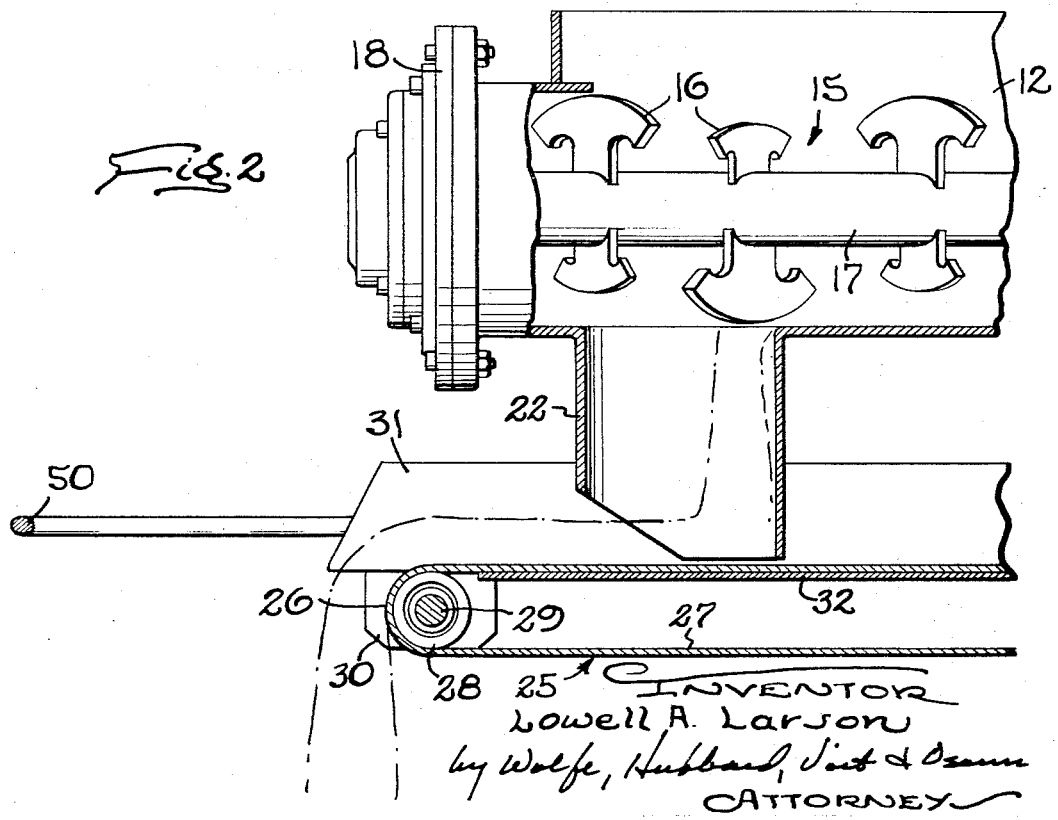
INVENTOR
Lowell A. Larson
by Wolfe, Hubbard, Voit & Osann
ATTORNEY Oct. 10, 1967  L. A. LARSON  3,346,239
COMBINED MATERIAL MIXER AND DISTRIBUTOR
Filed Jan. 4, 1966  2 Sheets-Sheet 2
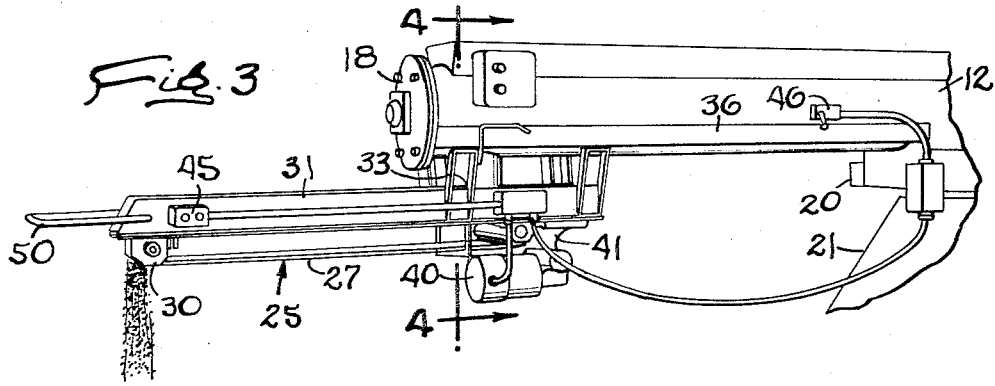
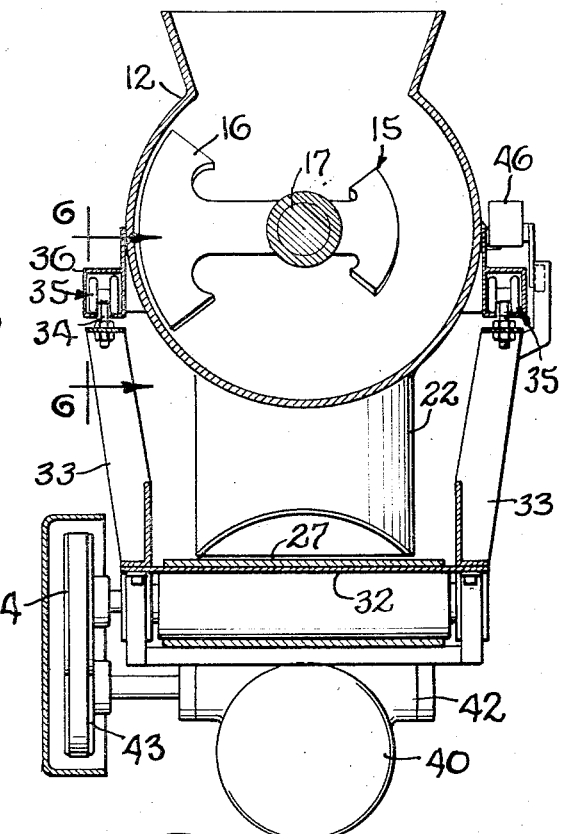
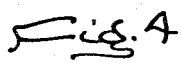
INVENTOR
Lowell A. Larson
by Wolfe, Hubbard, Voit & Osann
ATTORNEYS

United States Patent Office 3,346,239
Patented Oct. 10, 1967

3,346,239
COMBINED MATERIAL MIXER AND
DISTRIBUTOR
Lowell A. Larson, P.O. Box 59, Clintonville, Wis. 54929
Filed Jan. 4, 1966, Ser. No. 518,686
6 Claims. (Cl. 259—9)

This invention relates to a mixer of the type in which two or more materials such as sand and a resin binder, are fed into an elongated generally horizontal trough and are continuously mixed by a screw type conveyor by which the mixture is advanced to a discharge point. More particularly, the invention relates to a mixer in which the trough is mounted cantilever fashion to swing about a vertical axis, and the materials are discharged from an outlet at the free end of the trough which is swingable horizontally to enable distribution of the materials along an arcuate path of substantial length.

The general object of the invention is to improve the versatility of a mixer of the above character by extending the discharge range of the outlet into arcuate areas of substantial width disposed outwardly beyond the arcuate path of the trough outlet.

A further object is to achieve the foregoing by the provision of a power driven auxiliary conveyor carried by and extending along and beneath the trough and movable endwise back and forth across the trough outlet to receive the material mixture from the trough outlet and to distribute the material to any selected point within an arcuate area determined by the endwise position of the conveyor and the angular position of the trough.

The invention also resides in the novel manner of utilizing a power driven endless belt as the auxiliary conveyor and mounting the same on the trough for endwise sliding.

Other objects and advantages of the invention will become apparent from the following detailed description taken in connection with the accompanying drawings, in which:

FIGURE 1 is a partial perspective view of material mixing apparatus embodying the features of the present invention, the auxiliary conveyor being in retracted position.

FIG. 2 is an enlarged fragmentary side elevational view of the apparatus shown in FIG. 1 with parts being broken away and shown in moved positions.

FIG. 3 is a view similar to FIG. 1 with the auxiliary conveyor in extended position.

FIG. 4 is an enlarged fragmentary cross-section taken substantially along the line 4—4 of FIG. 3.

FIG. 5 is a schematic plan view illustrating the manner of distributing the discharged mixture to different selected areas.

FIG. 6 is an enlarged fragmentary cross-section taken substantially along the line 6—6 of FIG. 4.

FIG. 7 is a fragmentary cross-section taken substantially along the 7—7 of FIG. 6.

As shown in the drawings for purposes of illustration, the invention is incorporated in a mixer 10 in which granular material such as sand is delivered downwardly from a chute 11 into one end of an upwardly opening elongated trough 12 to which liquids such as binding ingredients are delivered through conduits 13 and 14 near the inlet end of the trough. The materials are mixed together thoroughly and advanced along the trough by a power driven screw 15 comprising helically inclined and axially spaced blades 16 projecting from a shaft 17 journaled in the end walls 18 of the trough and driven by a motor 19. The latter and the inlet end portion of the trough are secured to a plate 20 which rests on the top of a pedestal 21 and is swingable about a vertical axis defined thereby. The mixture thus advanced continuously along the trough is discharged downward through an outlet defined by a short pipe 22 depending from the bottom of the trough near its free end.

With the trough 12 thus supported cantilever fashion by the pedestal 21, it may be swung horizontally back and forth to dispose the outlet 22 at any point around an arc 23 (FIG. 5). The mixture thus may be distributed over a substantial area of a receptacle 24 which may be positioned under the trough.

The present invention contemplates extending substantially the width of the arcuate area over which the mixture discharged from the outlet 22 may be distributed. This is accomplished by suspending beneath and from the trough 12 an elongated auxiliary conveyor 25 mounted for back and forth endwise movement relative to the trough and adapted to receive the mixture discharged from the trough outlet and carry the mixture outwardly and discharge the same downwardly and off from the free outer end 26 of the conveyor. Thus, the point of discharge may be anywhere within a widened range A (FIG. 5) outwardly beyond the arc 23, such point at any time being determined by the angular position of the trough and also by the position to which the conveyor 25 is moved or extended outwardly from its inner retracted position shown in FIG. 1.

Preferably, the conveyor 25 is of the belt type and comprises an endless belt 27 trained around and tensioned between parallel rollers 28 having end trunnions 29 journaled in flanges 30 which depend from parallel frame rails 31 disposed below the trough along opposite sides thereof. The belt is somewhat wider than and centered relative to the trough outlet 22 and its upper run is supported on and slides along a plate 32 spanning the rails 31.

Rigid with and upstanding from the rails 31 and spaced along the latter near the inner ends thereof are standards 33 whose upper ends are bolted or otherwise secured to shanks 34 depending from two cars 35 which are supported by and adapted to slide along tubular guide bars 36 extending along and welded to the exterior of the trough along opposite sides and above the bottom thereof. Herein, each car 35 carries two longitudinally spaced pairs of axially spaced rollers 37 resting on separated coplanar flanges 38 of the tubes 36. The car shanks 34 thus move along the bottom slots 39 in the tubes as the conveyor 25 is slid back and forth.

The auxiliary conveyor 25 thus is supported cantilever fashion from the trough 12 for endwise sliding between the inner or retracter position shown in FIG. 1 to an outer limit position determined by engagement of the forward cars 35 with the enclosed ends of the tubes 36. Accordingly, selectively variable and overhanging lengths of the conveyor may be extended outwardly from the free end of the trough as illustrated in FIGS. 2, 3 and 5, and, depending on the angular position of the trough, the discharge end 26 of the belt 27 may be disposed at any desired point wherein the arcuate area A.

Herein, the conveyor belt is driven by an electric motor 40 mounted and hanging downwardly from a bracket 41 secured to and depending from the inner ends of the rails 31 and operating through reduction gearing within a box 42 to drive a pulley 43 connected by a belt with a pulley 44 fast on one end trunnion 29 of the inner roller 28. The motor, which may be started and stopped manually or automatically under the control of switches 45 and 46 runs in a direction to advance the material mixture outwardly to the discharge end 26 of the auxiliary conveyor 25.

Preferably, the conveyor 25 is somewhat shorter than the trough 12 so that in the retracted position, the discharge pipe 22 is uncovered as shown in FIG. 1. With the belt conveyor inactive, the mixture discharged from the pipe may be delivered at any point along the arc 23 (FIG. 5) depending on the position to which the trough 12 is swung by the machine operator.

To discharge the mixture at a point outwardly beyond the arc 23, the machine operator may grasp a U-shaped handle 50 rigid with the conveyor side plates 31 and pull the auxiliary conveyor 25 endwise from beneath the trough 12. When a large box, such as the box 24, is to be filled, it is advantageous to pull the auxiliary conveyor outwardly a short distance (as shown in full lines in FIG. 5) while at the same time swinging the trough 12 about the pedestal 21. The discharge end 26 of the conveyor thus will sweep along the arc 51 and the mixed material may be discharged into the extreme corners of the box. After this pass is completed, the conveyor may be further extended from the free end of the trough and swung with the trough in the opposite direction to distribute the material in proximity to the arc 52. By continuing this operation, as indicated by the arrows in FIG. 5, the material may be distributed along the far side of the box with the arc 53 representing the path of the discharge end 26 of the conveyor 25 when the latter is extended fully. It thus is apparent that the conveyor discharge end is swingable in a multiplicity of concentric arcs corresponding to the range of swinging of the trough 12 about the pedestal 21 and that the mixture may be discharged at any point within the area A defined by the arcs 23 and 53.

I claim as my invention:

1. A combined material mixer and distributor for mixing materials and discharging the mixture at various discharge points having, in combination, an elongated trough for receiving materials to be mixed near its upstream end and having an outlet near its downstream end, a power actuated screw within said trough operable to mix and advance the materials along the trough to said outlet, a pedestal mounting said trough cantilever fashion for swinging movement about an upright axis to position said outlet along an arcuate path spaced radially from said axis, an elongated, upwardly opening auxiliary conveyor disposed below and extending along said trough, and means on said trough supporting and guiding said conveyor for endwise movement outwardly and inwardly to present different areas along its length for receiving the material discharged from said outlet and carrying such material outwardly for discharge off from the outer end of the conveyor whereby to adapt said outer discharge end for swinging in a multiplicity of arcs concentric with said path and of length corresponding to the range of swinging of said trough about said axis.

2. A combined material mixer and distributor as defined in claim 1 in which said outlet comprises a discharge pipe disposed short of the free end of said trough and opening downwardly to discharge the material into the path of the endwise movement of said auxiliary conveyor.

3. A combined material mixer and distributor as defined in claim 1 in which said auxiliary conveyor is movable inwardly to a retracted position in which said outer end is disposed out of the path of the material discharged from said trough outlet.

4. A combined material mixer and distributor defined in claim 1 in which said auxiliary conveyor comprises an endless belt movably mounted on a frame suspended from said trough with the upper run of the belt disposed below said trough outlet.

5. A combined material mixer and distributor defined in claim 4 in which said belt is driven by a motor carried by said conveyor frame.

6. A combined material mixer and distributor as defined in claim 1 in which said conveyor includes laterally spaced guide elements fixed to and extending along substantially the full length of said trough, an elongated frame disposed below said trough and extending along a substantial length thereof, parallel rollers journaled on said frame near opposite ends thereof, a power driven endless conveyor belt extending around and tensioned between said rollers, and members upstanding from said frame near the inner end thereof with their upper ends engaging said guide elements to move along the latter whereby to suspend said frame cantilever fashion on said trough with the major length of the frame and belt projectable outwardly along the trough and beyond said outlet and thereby vary the point of discharge of the material according to the extent of such projection.

References Cited

UNITED STATES PATENTS

| | | | |
|---|---|---|---|
| 3,151,732 | 10/1964 | Oury et al. | 198—92 |
| 3,185,450 | 5/1965 | Duecy | 259—172 |
| 3,268,214 | 8/1966 | Higgs | 259—10 |

WILLIAM I. PRICE, *Primary Examiner.*

WALTER A. SCHEEL, *Examiner.*

J. M. BELL, *Assistant Examiner.*